United States Patent [19]

Shields et al.

[11] 4,154,681

[45] May 15, 1979

[54] COMBINED FILTERING AND AERATING DEVICE FOR AN AQUARIUM

[75] Inventors: Daniel W. Shields, Flanders, N.J.; Robert J. Kershaw, Warwick, R.I.

[73] Assignee: Aquarium Stock Company Inc., New York, N.Y.

[21] Appl. No.: 862,486

[22] Filed: Dec. 20, 1977

Related U.S. Application Data

[63] Continuation-in-part of Ser. No. 777,337, Mar. 14, 1977, abandoned, which is a continuation of Ser. No. 673,951, Apr. 5, 1976, abandoned.

[51] Int. Cl.² .............................................. E04H 3/20
[52] U.S. Cl. ...................................... 210/169; 417/201
[58] Field of Search .................. 210/169; 119/3, 5; 417/350, 424, 201; 415/215

[56] References Cited

U.S. PATENT DOCUMENTS

| 2,295,982 | 9/1942 | Widman | 210/169 X |
|---|---|---|---|
| 2,643,614 | 6/1953 | Rosenkrans | 417/350 X |
| 2,844,912 | 7/1958 | Sebestg | 119/5 |
| 3,102,483 | 9/1963 | Najimion, Jr. et al. | 417/350 |
| 3,261,471 | 7/1966 | Halpert | 119/5 |
| 3,265,388 | 8/1966 | Kane | 119/5 |
| 3,272,129 | 9/1966 | Leopold | 417/350 |
| 3,635,344 | 1/1972 | Lovitz | 119/5 |
| 3,744,635 | 7/1973 | Horrath | 210/169 |
| 3,773,015 | 11/1973 | Cruickshank et al. | 119/5 |

*Primary Examiner*—Theodore A. Granger
*Attorney, Agent, or Firm*—Toren, McGeady and Stanger

[57] ABSTRACT

A combined aerating and filtering device includes a filter box to be mounted on the side wall of an aquarium for carrying filter material through which water from the aquarium will pass to be filtered. A combined filter pump and air pump assembly is supported by the filter box and includes a housing, a motor carried within the housing, an air pump carried in the housing and driven by the motor and a filter pump driven by the motor. An air outlet is carried by the housing and connected with the air pump to thus provide means for aerating the aquarium. The filter pump extends into the filter box to draw water from the aquarium through the filter material within the filter box, and to return the filtered water to the aquarium.

7 Claims, 3 Drawing Figures

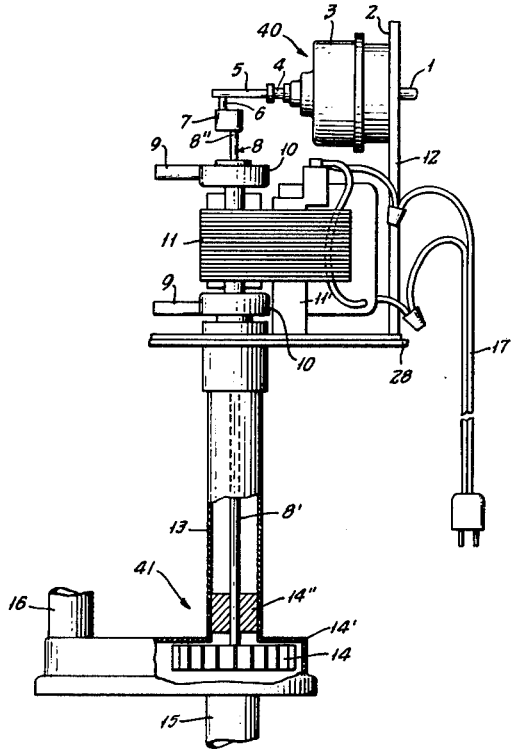

4,154,681

COMBINED FILTERING AND AERATING DEVICE FOR AN AQUARIUM

CROSS REFERENCE

This application is a continuation-in-part of application Ser. No. 777,337 filed Mar. 14, 1977, now abandoned which was a continuation of application Ser. No. 673,951 filed Apr. 5, 1976 now abandoned.

BACKGROUND OF THE INVENTION

The present invention relates generally to accessories for home aquariums and more particularly to such accessories which provide means for filtering and aerating the water used in the aquarium.

Both filtering and aerating devices for use in home aquariums are of course well known in the art. One type of typical filtering device previously known includes a housing containing filtering material to be submerged within an aquarium and to which is attached tubing for drawing water from the aquarium into the filter housing. A separate pump which can be mounted externally of the aquarium, is connected to the tubing to provide the necessary power to draw the water through the filter. Alternatively, filtering devices having a filter container intended to be mounted on the side of an aquarium with means extending below the surface of the water for drawing the water into the container have also been suggested. One such type of filtering device which is intended to be mounted on the side of an aquarium is shown in U.S. Pat. No. 3,635,344. This device includes a screw type elevator tube extending below the surface of the water in the aquarium. The elevator is driven by a motor supported within the housing. The motor drives the screw type elevator to draw water up into the filter housing. A deflector mounted on the motor shaft protects the motor from water drawn into the filter.

Existing aerating devices are also known in the art and usually include air pumping means connected to tubing extending below the surface of the water in the aquarium. The tubing is typically connected to airstones or other ornamental objects placed at the bottom of the aquarium.

The aquarist who desires to provide both filtering and aerating devices is required to obtain separate devices to accomplish each function. A separate air pump and a separate filtering device would have to be mounted on and about the aquarium to provide both the aerating and filtering functions. This tends to be costly since separate purchases are required. The use of numerous accessories on and about an aquarium also tends to be objectionable in that the aquarium becomes cluttered with accessories.

It is accordingly an object of the present invention to provide a combined aerating and filtering device for use on an aquarium which overcomes the disadvantages of the prior art requiring separate devices for each function.

A more specific object of the present invention is to provide in a combined filtering and aerating device, a single motor having a motor shaft driving at one end thereof a filter pump for drawing water from the aquarium through a filtering material, and driving at the other end thereof an air pump to provide aeration into the aquarium.

Other objects, features and advantages of the present invention will become more apparent from the description of the invention in connection with the accompanying drawings to be described more fully hereinafter.

SUMMARY OF THE INVENTION

The objectives of the invention are accomplished by providing a combined aerating and filtering device which includes a filter box to be mounted on the side wall of an aquarium for carrying filter material through which water from the aquarium will pass to be filtered. A combined filter pump and air pump assembly is supported by the filter box and includes a housing, a motor carried within the housing, and an air pump and a filter pump driven by a common shaft of the motor. An air outlet is carried by the housing and connected with the air pump to provide means for aerating the aquarium. The filter pump extends into the filter box to draw water from the aquarium through the filter material within the filter box, and to return the filtered water to the aquarium.

The foregoing and other features of the present invention are more fully described with reference to the following drawings annexed hereto.

DESCRIPTION OF THE INVENTION

Figure 1:
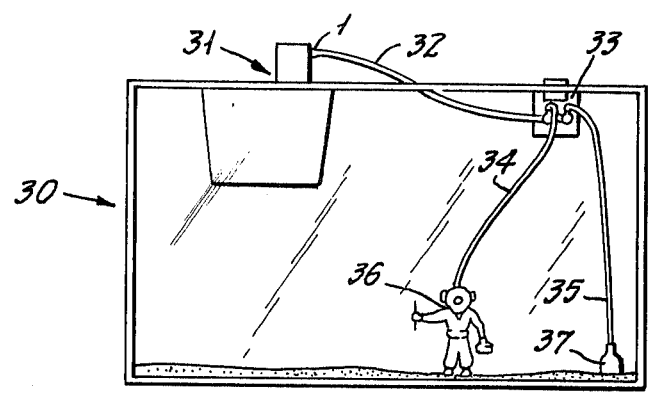
FIG. 1 is a side elevational view of a home type aquarium showing the position for mounting the present invention.

Referring now in more detail to the accompanying drawings, FIG. 1 illustrates an aquarium 30 having the combined filtering and aerating device, referred to generally as reference numeral 31, in accordance with the present invention, mounted on a side wall of the aquarium. Appropriate tubing 32 extends between an air outlet 1 of the aerating pump portion of the present invention, to be described more fully hereinafter, and a valve 33. Tubes 34 and 35 can extend from the valve 33 to common types of ornaments 36 or airstones 37 at the bottom of the aquarium through which air can be bubbled for aerating the water within the aquarium.

Figure 2:
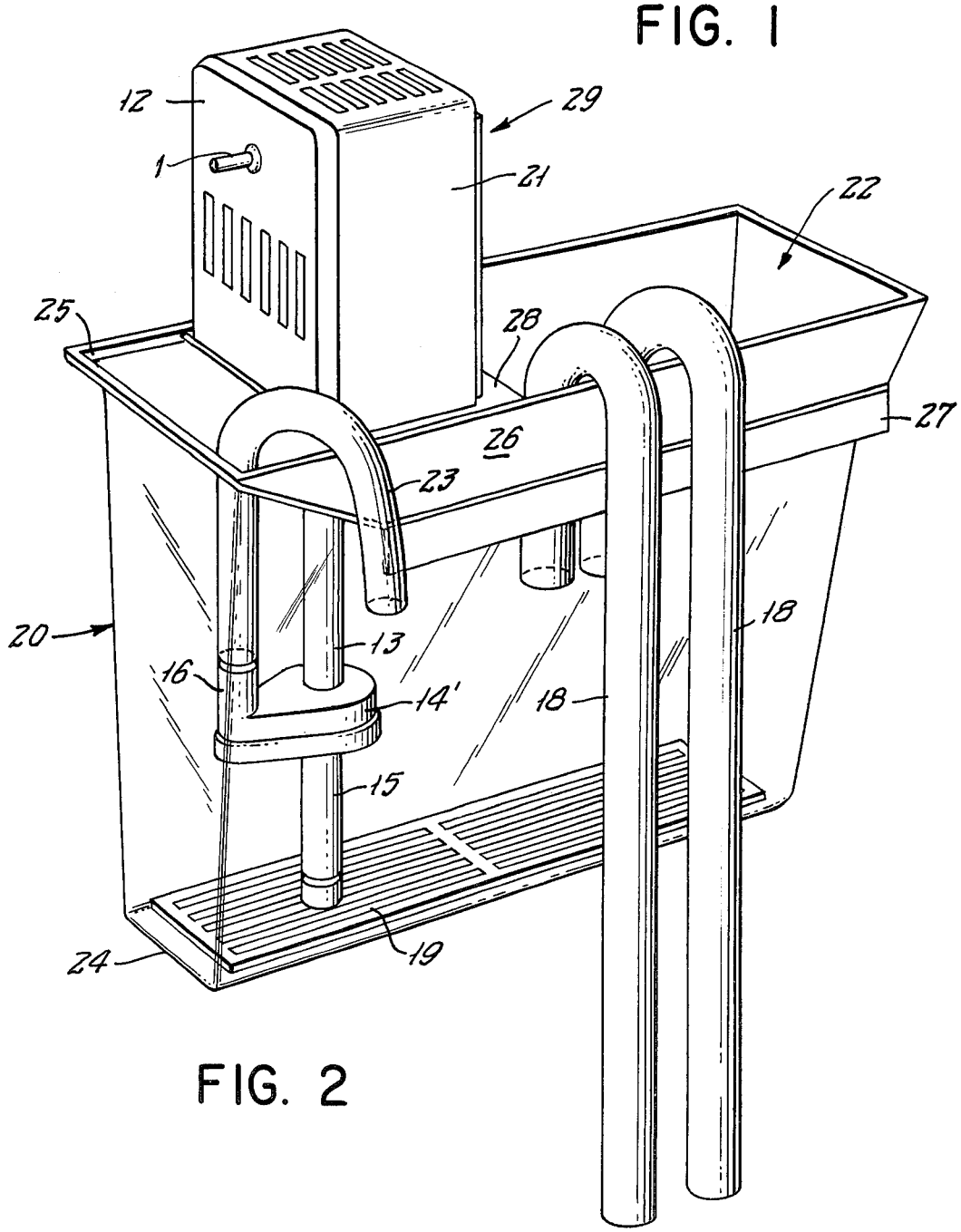
FIG. 2 is a perspective view of the present invention showing external and operating features thereof.

Referring now to FIG. 2, the combined aerating and filtering device 31 of the present invention is shown as including a plastic filter box 20 having a bottom 24, an open top, a top ledge 25 surrounding the open top, an extended flange 26 connected to the top ledge 25 along one side wall of the filter box 20, and a hook flange 27 extending downwardly from the flange 26. Resting on the bottom 24 of the filter box 20 is a louvered platform 19. The interior of the filter box 20 forms an area 22 for carrying filter material, such as activated charcoal, which rests upon platform 19 and through which the water to be filtered will pass. The filter box 20 can therefore be mounted on a side wall of an aquarium using the hook flange arrangement 26, 27 to support the filter box in place, such as shown in FIG. 1.

A combined filter pump and air pump assembly 29 having a housing 21 is carried on a plate 28 which rests on ledge 25 across the open top of the filter box 20. The assembly 29 provides both the air for aerating the aquarium and the pump for drawing water from the aquarium through the filter box.

Figure 3:
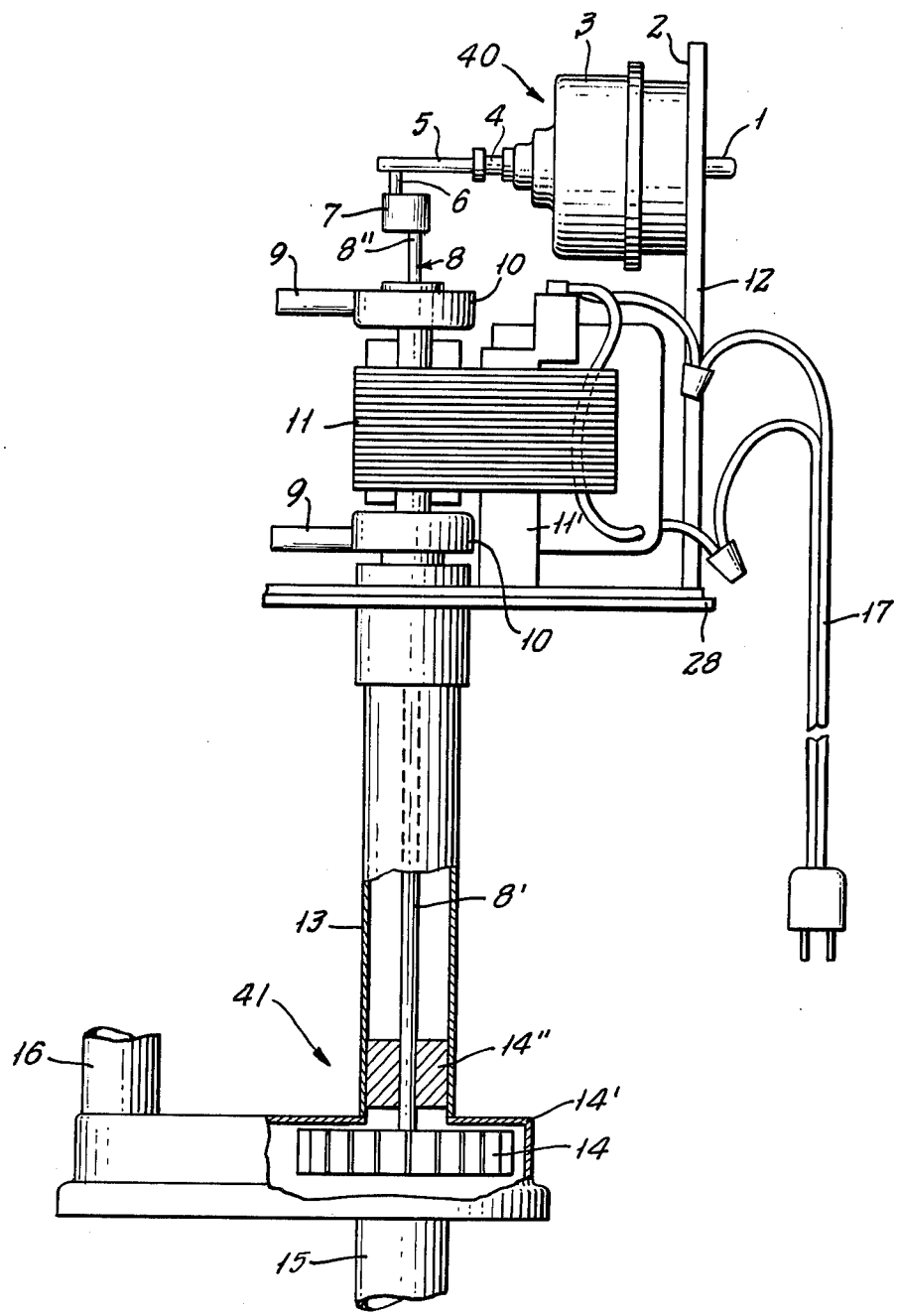
FIG. 3 is a side elevational view showing details of the combined aerating pump and filter pump assembly with the housing removed.

FIG. 3 illustrates the combined filter pump and air pump assembly 29 with housing 21 removed to show the various features of the present invention. Plate 28 carries an upright wall 12 for supporting the various elements of the air pump referred to generally as reference numeral 40. The air pump 40 includes a diaphragm housing 2 mounted on wall 12, a diaphragm 3 supported by the housing 2 and an air outlet 1 supported in an aperture on the wall 12. The housing 2 therefore couples the diaphragm 3 with the outlet 1.

A motor 11 is mounted on the plate 28 by a motor bracket 11'. The motor 11 supports a shaft 8 having both ends of the shaft extending through the motor, one end being designated 8', the other end being designated 8". The shaft 8 is journaled for rotation on both sides of the motor in bearings 10. Lubrication connections 9 provide means for lubricating the bearings 10 if necessary.

The upper end of shaft portion 8" located above the motor carries an eccentrically mounted cam 7. A shaft 6 is rotatably journaled at one end thereof to the cam 7 in an off-centered position, and at the other end thereof to a link 5. Upon rotational movement of shaft position 8", eccentric rotation of cam 7 will cause linear reciprocal movement of the link 5. Appropriate bearings support the shaft 6 between the cam 7 and link 5. A diaphragm coupling 4 couples the link 5 to the diaphragm 3 so that upon linear movement of the link 5, diaphragm 3 will operate to cause appropriate pumping of air through the air outlet 1.

The filter pump portion 41 of the assembly 29 includes a shaft portion 8' which extends below the motor 11 and is journaled for rotation within a shaft housing 13 by bearing 14". An impeller 14 is carried at the end of shaft 8' remote from the motor 11 within a water tight impeller housing 14' for rotation with shaft 8'. An inlet conduit 15 is connected at one end to one side of the impeller housing 14', the other end being opened. An outlet conduit 16 is connected to the other side of impeller housing 14' and communicates with a discharge conduit 23. In use, when the assembly 29 is supported across the open top of filter box 20, the shaft housing 13 and impeller housing 14' will extend below the surface of water within the filter box 20 and the open end of inlet conduit 15 will be located at the bottom of filter box 20 to communicate with filtered water. Accordingly, shaft housing 13 and impeller housing 14' are water tight to allow impeller 14 to draw filtered water into the housing 14' through conduit 15 and cause it to exit outlet conduit 16.

An electric cord 17 is provided to supply electric current for driving the motor 11.

When fully assembled in the manner shown in FIG. 2, the shaft housing 13 and impeller housing 14' of assembly 29 will extend into the filter box 20. When filter box 20 is fully charged with filter material and water, and when motor 11 is energized, the impeller 14 will draw filtered water into housing 14" through conduit 15 to be pumped into conduit 16 and discharged through conduit 23 to return to the aquarium. Siphon tubes 18 provide means for drawing unfiltered water from the aquarium into the filter area 22 of the filter box 20 for proper filtering. Simultaneously, motor 11 will drive the diaphragm pump 40 through off-center cam 7 and link 5 to pump air through the air outlet 1. Tubings 32, 34, 35 and valve 33 can be connected with the outlet 1 as hereinbefore described to drive air through an appropriate airstone 37 or ornament 36 for proper aeration of the aquarium.

It will be appreciated from the foregoing that a novel arrangement of a combined aeration pump and filter eliminates many of the disadvantages of the prior art requiring separate devices for these functions.

While the invention has been described and illustrated with respect to a certain preferred embodiment which produces satisfactory results, it will be appreciated by those skilled in the art after understanding the purposes of the invention, that various changes and modifications may be made without departing from the spirit and scope of the invention and it is therefore intended to cover all such changes and modifications in the appended claims.

What is claimed is:

1. A combined aerating and filtering device comprising a filter box having an open top for supporting filter material therein, means for conveying water from an aquarium into said filter box, a combined filter pump and air pump assembly mounted on said filter box, said assembly comprising an assembly housing, a motor carried within said housing, a shaft connected to and rotated about an upwardly extending axis by said motor, said shaft having an upper portion extending upwardly from said motor and a lower portion extending downwardly from said motor, a diaphragm air pump carried within said housing above said motor and driven by said shaft, means interconnecting said shaft and said air pump for translating the rotational motion of said shaft into linear motion for operating said air pump, air outlet means on said housing and connected to said air pump for providing air into the aquarium, and filter pump means dependently supported by said housing and driven by said lower portion of said shaft for pumping filtered water from said filter box into the aquarium.

2. The combined aerating and filtering device according to claim 1 wherein said filter pump comprises a shaft housing depending from said assembly housing and extending into said filter box, a water tight impeller housing supported by said shaft housing and spaced downwardly from said assembly housing, said lower portion of said motor shaft extending downwardly from said motor through said shaft housing and into said impeller housing, an impeller mounted on said lower portion of said motor shaft within said impeller housing for rotation therewith, an inlet conduit connected to said impeller housing for drawing filtered water from said filter box into said impeller housing, and an outlet conduit connected to said impeller housing through which filtered water is returned from said impeller housing into the aquarium.

3. The combined aerating and filtering device according to claim 2 further comprising bearing means carried within said shaft housing for journaling said lower portion of said motor shaft therein.

4. The combined aerating and filtering device according to claim 1 wherein said assembly housing comprises a side wall, said diaphragm pump including a diaphragm housing mounted on said assembly housing side wall and a diaphragm carried by said diaphragm housing, said translating means comprises a linkage connecting said diaphragm to said upper portion of said motor shaft for imparting linear motion to said diaphragm when said motor shaft is rotated, and said air outlet means extending through said side wall of said assembly housing and communicating with said diaphragm pump.

5. The combined aerating and filtering device according to claim 4 wherein said linkage connecting said upper portion of said motor shaft with said diaphragm comprises a cam eccentrically mounted on the end of said upper portion of said motor shaft remote from said motor, an upwardly extending coupling shaft mounted in an off-center position on said cam, a diaphragm coupling attached to said diaphragm, a link extending transversely of the axial direction of said motor shaft and connected at one end thereof to said coupling shaft and at the other end thereof to said diaphragm coupling for effecting linear motion of said diaphragm upon rotation of said shaft.

6. The combined aerating and filtering device according to claim 1 wherein said means for feeding water from said aquarium into said filter box comprises at least one siphon tube having one end thereof communicating with water in said aquarium and the other end thereof communicating with the interior of said filter box.

7. The combined aerating and filtering device according to claim 1 further comprising means for supporting said combined filter pump and air pump assembly across the open top of said filter box.

* * * * *